No. 766,296. Patented August 2, 1904.

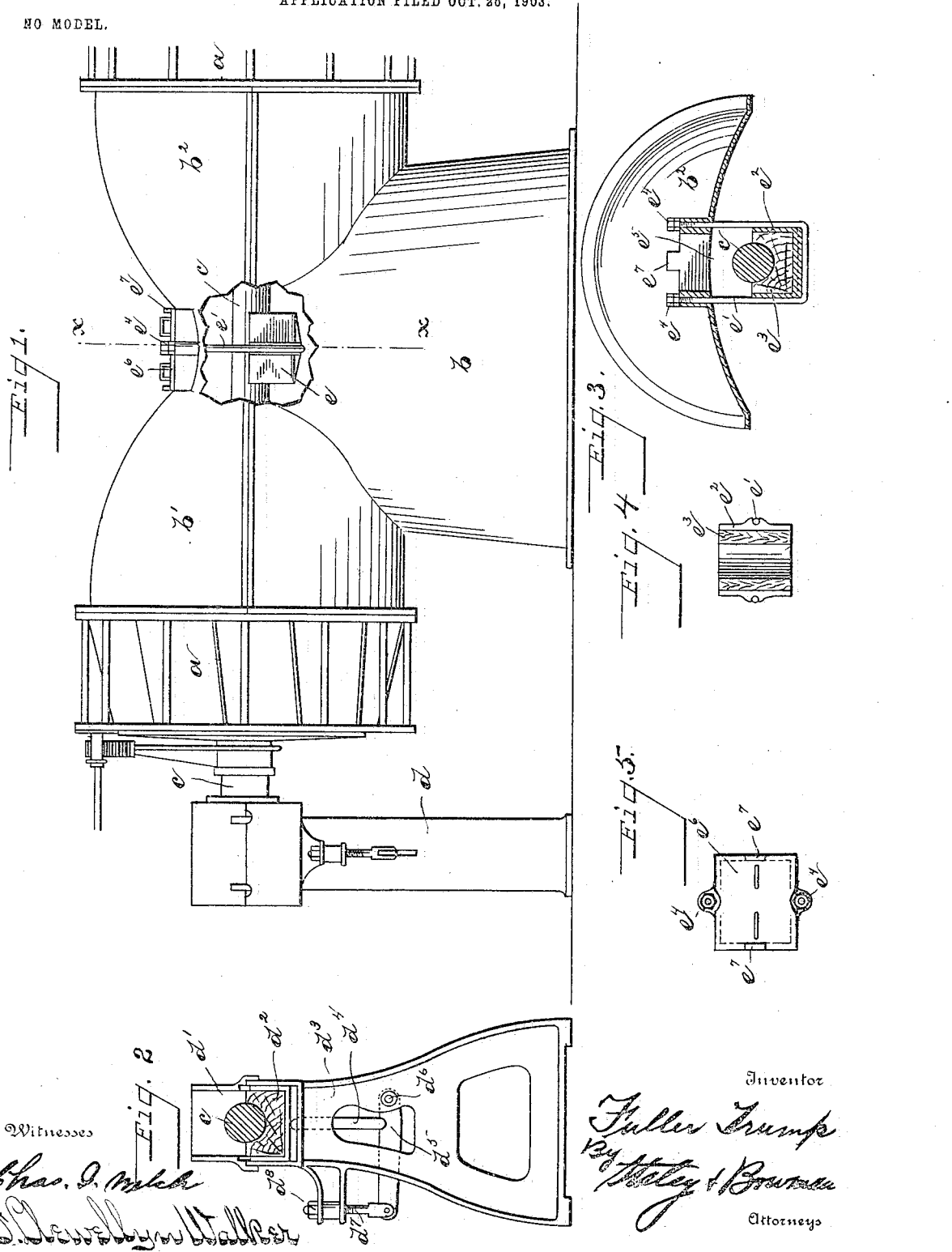

UNITED STATES PATENT OFFICE.

FULLER TRUMP, OF SPRINGFIELD, OHIO.

BEARING FOR WATER-WHEEL SHAFTS.

SPECIFICATION forming part of Letters Patent No. 766,296, dated August 2, 1904.

Application filed October 26, 1903. Serial No. 178,453. (No model.)

*To all whom it may concern:*

Be it known that I, FULLER TRUMP, a citizen of the United States, residing at Springfield, in the county of Clark and State of Ohio, have invented certain new and useful Improvements in Bearings for Water-Wheel Shafts, of which the following is a specification.

My invention relates to improvements in bearings for water-wheel shafts, and it especially relates to bearings for shafts of horizontal wheels.

My invention consists in the constructions and combinations hereinafter described and claimed.

In the accompanying drawings, Figure 1 is a side elevation of a device embodying my invention. Fig. 2 is an end view of a portion of same. Fig. 3 is a sectional view of the same, taken on the line $x\, x$ in Fig. 1. Fig. 4 is a detail view showing the bearing-block in Fig. 1, and Fig. 5 is a detail plan view of the cap and bearing-support.

Like parts are represented by similar letters of reference in the several views.

In the installation of turbine water-wheels on a horizontal shaft, or what are known as "horizontal" wheels, difficulty has been experienced in the adjustment of the bearings to compensate for wear. It is quite the common practice to mount these turbine water-wheels on what are called "draft-chests," which set in the flume or penstock and connect the main water-wheel shaft through suitable outlet-openings to the armature of electric generators or to that part to which power is to be applied. Any variation, therefore, in the alinement of the shaft resulting from wear or otherwise is extremely detrimental. To the appliances heretofore used it has been difficult to adjust bearings to compensate for wear and to bring them in alinement, as the parts run in water, and the shaft, moreover, is largely inclosed within the draft-chests. I have therefore arranged to overcome this difficulty by providing the novel bearings shown in the drawings.

In said drawings, $a\, a$ represent turbine water-wheels of any type; $b$, the draft-chest having the oppositely-extending branches $b'\, b^2$, to which the outlet-openings or discharge end of the wheel is applied.

$c$ is the water-wheel shaft, which extends through the draft-chest and carries the respective wheels $a\, a$, and is supported at each end by a bearing-block $d$ and at the center by a suspended bearing $e$. The outer bearings $d$ consist, essentially, of a casing $d'$, into which is fitted a bearing-block $d^2$, preferably of wood, the upper part of the casing $d'$ being open to permit the access of the water with which the bearing is surrounded, or it may be used to receive a lubricant, if desired. The bearing-casing $d'$ fits in the bifurcated top of a stand $d^3$ and rests on the end of a vertical shaft or pin $d^4$, the lower end of which is seated in the end of a pivoted lever $d^5$, hinged at $d^6$ to the stand and at its outer end hinged to a screw-threaded rod $d^7$, having an adjusting-nut $d^8$. The shaft or pin $d^4$ is rounded at each end and forms a universal bearing-support with the bearing-casing and the lever, respectively, so that by turning the nut $d^8$ the bearing $d^2$ may be raised or lowered and maintain always a proper position with reference to the shaft $c$.

The bearing $e$ within the draft-chest is suspended from the top of the draft-chest by a U-shaped support $e'$, which extends around a bearing-support $e^2$, which carries the bearing-block $e^3$. The respective ends of the U-shaped support $e'$ are screw-threaded and provided with adjusting-nuts $e^4$ at the top, whereby the bearing may be raised or lowered to compensate for wear or for other adjustment from the outside of the casing or draft-chest. Immediately over this suspended bearing there is an opening $e^5$ provided in the top of the draft-chest. This opening is normally closed by a loosely-seated cover $e^6$, the pressure of the water being sufficient to hold it in place. Said opening $e^5$ is surrounded by upwardly-projecting sides, upon which the cover $e^6$ rests. At each end there are provided lugs $e^7$, which extend above the top and the sides of the opening and also above the cover, the cover being notched out to fit over said lugs and also notched out at the sides, so as to stand free from the adjusting-nuts $e^4$. The lugs $e^7$ are faced off so as to be in accurate alinement with the center line of the draft-chest and furnish the means of leveling the draft-chest when placing it in position and also of readily adjusting the shaft to the proper alinement without the necessity of going into the draft-chest. This is accomplished as follows: When the wheels are in place and the draft-chest leveled up with the shaft in exact alinement, the distance is accurately measured from the top of the lugs $e^7$ to the top of the shaft and recorded. Hence if at any time the shaft becomes out of alinement by reason of the wear on the bearings it is only necessary to adjust the various bearings by the adjusting-nuts until the exact measurement from the top of the lugs to the top of the shaft is secured, when the parts will be in perfect alinement. The removable cover also furnishes the means for examining the suspended bearing at any time without having other access to the draft-chest.

Having thus described my invention, I claim—

1. The combination with the water-wheel, the draft-chest, and the horizontal shaft extending through the draft-chest as described, of the adjustable bearings supporting said shaft, one of said bearings being suspended from the top of the draft-chest, and a removable cover and adjusting-nuts, and the leveling-lugs on the outside of said draft-chest, substantially as specified.

2. The combination with the inclosed casing or draft-chest, a horizontal shaft passing through the same, an adjustable bearing consisting of a suspended block, an adjustable support for said block, an orifice above said block having a removable cover, and extending lugs at each end of said orifice, substantially as and for the purpose specified.

3. The combination with the water-wheel, the draft-chest, and the horizontal shaft extending through the draft-chest as described, of the adjustable bearings supporting said shaft, one of said bearings being suspended from the top of the draft-chest, and a removable cover on the outside of said draft-chest, for the purpose specified.

In testimony whereof I have hereunto set my hand this 23d day of October, A. D. 1903.

FULLER TRUMP.

Witnesses:
 CHAS. I. WELCH,
 CLIFTON P. GRANT.